US007143342B1

(12) United States Patent
Baweja et al.

(10) Patent No.: US 7,143,342 B1
(45) Date of Patent: Nov. 28, 2006

(54) DISTRIBUTING CONDENSED VERSIONS OF DISPLAYABLE INFORMATION IN HYPERTEXT MARKUP LANGUAGE DOCUMENTS TRANSMITTED ON THE WORLD WIDE WEB TO PERSONAL PALM-TYPE DISPLAY COMPUTERS

(75) Inventors: Baljeet Singh Baweja, Austin, TX (US); Kulvir Singh Bhogal, Austin, TX (US); Nizamudeen Ishmael, Jr., Austin, TX (US); Mandeep Singh Sidhu, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1072 days.

(21) Appl. No.: 09/589,666

(22) Filed: Jun. 8, 2000

(51) Int. Cl.
*G06F 15/00* (2006.01)

(52) U.S. Cl. .................... 715/513; 715/700; 715/710; 715/855

(58) Field of Classification Search ................ 715/513, 715/501.1
See application file for complete search history.

(56) References Cited

U.S. PATENT DOCUMENTS

| 5,905,908 | A | | 5/1999 | Wagner | 395/831 |
| 5,953,523 | A | | 9/1999 | Martinez et al. | 395/701 |
| 6,076,109 | A | * | 6/2000 | Kikinis | 709/228 |
| 6,247,048 | B1 | * | 6/2001 | Greer et al. | 709/219 |
| 6,311,180 | B1 | * | 10/2001 | Fogarty | 707/4 |
| 6,446,111 | B1 | * | 9/2002 | Lowery | 709/203 |
| 6,593,944 | B1 | * | 7/2003 | Nicolas et al. | 345/744 |
| 6,604,130 | B1 | * | 8/2003 | Donoho et al. | 709/204 |
| 6,857,102 | B1 | * | 2/2005 | Bickmore et al. | 715/501.1 |

OTHER PUBLICATIONS

HDML 2.0 Specification—Preface, [http://www.w3.org/TR/hdml20-3.html], Unwired Planet, Apr. 11, 1997, p. 1-2.*
Spyglass Prism Published 1997 by Spyglass, Inc,Whole Document.*

* cited by examiner

*Primary Examiner*—William Bashore
*Assistant Examiner*—Quoc A. Tran
(74) *Attorney, Agent, or Firm*—Jerry B. Kraft; Jeffrey S. LaBaw

(57) ABSTRACT

There is provided to developers and owners of Web documents, the ability to create Hypertext Markup Language (HTML) documents, which in addition to their basic set of natural language data conveying a first version of information of a particular content displayable to users at conventional Web desktop display stations, a second set of natural language data conveying a second version of condensed displayable information of the same particular content displayable to users of personal palm-type display computers connected to the Web. Also, in addition to the basic set of HTML tags which identify the basic set of natural language data, the document provides for a second set of tags identifying said second set of natural language data which is available only for the palm-type devices. The natural language data to be displayed may include both text and image data. The accessing of the tagged natural language data, which is only available to the to the palm-type devices, may be accomplished by a program which may be conveniently implemented through the Web browser associated with and supporting the palm-type computer. The program recognizes the second set of tags and implements the access of the second set of condensed information suitable for the palm-type computer and displays the condensed information on the palm device.

27 Claims, 5 Drawing Sheets

DISTRIBUTING CONDENSED VERSIONS OF DISPLAYABLE INFORMATION IN HYPERTEXT MARKUP LANGUAGE DOCUMENTS TRANSMITTED ON THE WORLD WIDE WEB TO PERSONAL PALM-TYPE DISPLAY COMPUTERS

TECHNICAL FIELD

The present invention relates to personal digital assistant computers, generally referred to as personal palm-type computers, and more particularly, to the distribution of World Wide Web (Web) document information content to such palm devices.

BACKGROUND OF RELATED ART

Personal Digital Assistant (PDA) display terminals, such as the 3Com PalmPilot™ and the International Business Machines Corporation (IBM) WorkPad™ have been building a user base over the past few years. Current estimates are that there are several million of these devices in present usage. While these personal devices have found limited selective markets among users with specific needs and habits, they have not, as yet, found the widespread appeal which was expected when they first began to appear almost a decade ago. Consequently, the technology is seeking applications of greater mass appeal. One area of great potential is in the area of communication through the Web or Internet (used synonymously). Initially, the palm-type computers accessed the Web through the Web browser programs of the desktop computer with which the palm-type device was synchronized, e.g. HotSynced, where the device is synchronized with a desktop personal computer which functions as a receiving station on the Web, so that the communication may be through the synchronized personal computer. In recent years, personal palm devices have also developed a networking protocol: TCP/IP, which permits direct connection to the Web through PDA modems, which are described in greater detail at pp. 148–149 of the text *Palm III & PalmPilot,* Jeff Carlson, Peachpit Press, 1998. With either approach, users accustomed to browsing the Web by using a desktop computer with highly visual Web documents with multiple graphics and animations, initially experience disappointment with the limited display of the personal palm device. Manipulation of information on this small display is difficult since the user has to scan and scroll in all directions to comprehend information laid out for conventional larger screen desktop computer displays.

There are Web browser programs such as ProxiWeb which significantly reduce the Web page size to fit the confines of the palm-type device. However, this browser program detours the HTML data through a proxy server which resizes the Web page. In most cases, the information on the palm-type device screen is so small that it is difficult and frustrating to read.

SUMMARY OF THE PRESENT INVENTION

The present invention involves the acceptance of the fact that it is not possible to provide the color, graphics and image qualities and quantities of the standard desktop computer display on the palm-type device screen. However, the invention also recognizes that since the number of palm-type devices in general usage is approaching ten million and growing, developers and owners of Web documents will need some simple and effective way of communicating their information to palm-type devices.

Accordingly, the present invention provides to the developers and owners of Web documents, the ability to create Hypertext Markup Language (HTML) documents which in addition to their basic set of natural language data conveying a first version of information of a particular content displayable to users at conventional Web desktop display stations, provide a second set of natural language data conveying a second version of condensed displayable information of the same particular content displayable to users of personal palm-type display computers connected to the Web. Also, in addition to the basic set of HTML tags, which identify the basic set of natural language data, the document provides for a second set of tags identifying said second set of natural language data which is available only for the palm-type devices. The natural language data to be displayed may include both text and image data.

The accessing of the tagged natural language data, which is only available to the palm-type devices may be accomplished by a program which may be conveniently implemented through the Web browser associated with and supporting the palm-type computer. The program recognizes the second set of tags and implements the access of the second set of condensed information suitable for the palm-type computer and displays the condensed information on the palm device.

The present invention is available to palm-type computers which access the Web directly in which case the accessing program could be associated with the palm-type device browsers. Alternatively, if the palm-type device is configured so as to be synchronized with a related desktop computer, e.g. HotSynced, then the palm device accessing program may be associated with the desktop computer Web browser.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

Figure 1:
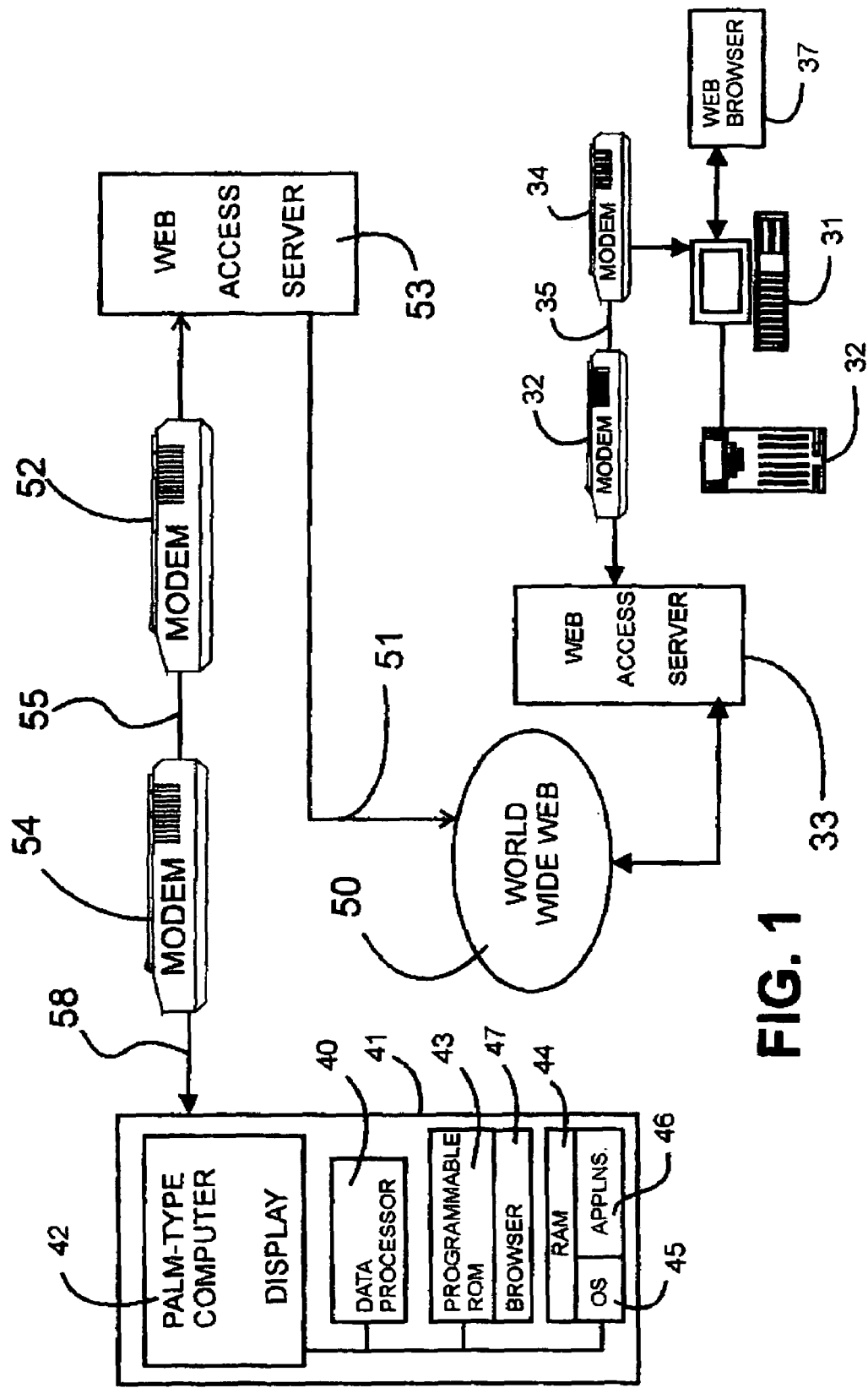
FIG. 1 is a generalized diagrammatic view of a Web portion on which the present invention may be implemented including palm-type devices configured to access the Web both directly or through a synchronized related desktop computer.

Referring to FIG. 1, there is shown a very generalized diagram of a Web portion on which the present invention may be implemented, including palm-type devices configured to access the Web both directly or through a synchronized related desktop computer. However, before proceeding further with this description, we will, at this point, provide some background with respect to the PDAs or personal palm-type devices involved in the present invention. The most common PDAs included in the present generic definition: personal palm-type devices include Microsoft's WinCE line; the PalmPilot line produced by 3Com Corp.; and IBM's WorkPad. These devices are comprehensively described in the previously mentioned text, *Palm III & PalmPilot.* Palm-type computer 41, as shown in FIG. 1 which connected directly into the Web 50, as will be later described, contains a data processor 40, operating system 45 and application programs 46 which are shown during operation in device Random Access Memory (RAM) 44. Current palm devices contain about 2 to 4 MB of RAM. Also included is a permanent programmable memory, a programmable Read Only Memory (ROM) 43 which may be an EPROM or flash ROM, which are described in the text at page 38. Because these flash ROMs can now provide 4 MB of capacity, more of the application programs heretofore stored on the personal palm device's RAM may now also be stored in this ROM, in addition to the device operating system and built-in applications which are, conventionally, also stored in the ROM until needed and then moved into RAM. Flash ROMs may be written into by a technique known as flashing so that future updates can be distributed as software and flashed into the ROM hardware.

Personal palm devices also have a networking protocol, TCP/IP, which permits connection to the Web 50 through PDA modems, e.g. modems 54 and 52, which are described in greater detail at pp. 148–149 of the above-described text. The palm-type computer 41 may connected into the Web 50 through standard Web wired modem connections. Reference may be made to the text, *Mastering the Internet,* G. H. Cady et al., published by Sybex Inc., Alameda, Calif., 1996, particularly pp. 136–147, for typical connections between local display stations to the Web 50 via access server 53 through connection 51. The embodiment of FIG. 1 has a host-dial connection. Such host-dial connections have been in use for over 30 years through network access servers 53 which are linked 51 to the Web 50. The servers 53 may be maintained by a service provider to the personal palm-type device 41. The host's server 53 is accessed by the client device 41 through a normal dial-up telephone linkage 58 via modem 54, telephone line 55 and modem 52. The connection to access server 53 may also be made through wireless modems, described, for example, at pages 148 and 149 of the above-mentioned *Palm III & Palm Pilot* text.

Alternatively, the palm-type computer 32 may be connected into the Web through its corresponding or related desktop computer 31 in the case where the palm device is configured in a synchronized relationship with the desktop. In such a case, the desktop computer's Web connection through modems 32 and 34 and connector 35 through Web access server 33 will provide appropriate Web access for the palm-type device under the control of the desktop computer's browser 37.

It should be noted that the term personal palm-type device is used to generally cover al varieties of palm-type devices. These include cellular phones and related wireless devices, smartphones, and Internet screen phones.

Irrespective of the palm-type computer's configuration in accessing the Web directly or indirectly through the related desktop computer, the present invention provides the developers or the owners of Web HTML documents with the ability to provide condensed versions of displayable information identified by tags and accessible for only the Palm-type computers or devices. There follows an example of the code for such an HTML document.

HTML CODE FOR WEB DOCUMENT

```
<html>
<head>
<title>Movie Times</title>
<meta http-equiv="Content-Type" content="text/html; charset=iso-8859-1">
</head>
<body bgcolor="black">
<table width="600" border="0" cellspacing="0" cellpadding+"0")>
<tr>
   <td colspan=2 width=600><img scr="banner.jpg" width="600" height="61"></td>
</tr>
<tr>
   <td width=277 valign=top><img src="xyz.jpg" width="277" height="339"></td>
   <td width=323 bgcolor=black valign=top>
      <p><font color="white" face="Arial, Helvetica, sans-serif" size="2">Showing
      at: <br>
      MY CREEK CINEMA <br>
      2224 Somestreet<br>
      </font><font color="white" face="Arial, Helvetica, sans-serif size="2">
      Someplacein, TX 78746<br>
      </font><font color="white" face="Arial, Helvetica, sans-serif size="2">
      512-333-2222 <br>
      ADULT $7.00, CHILD $4.50, BARGAIN BEFORE 5PM & ALL DAY TUESDAY $4.50, FIRST MATINEE SHOWTIME $3.50, ADULT FRIDAY & SATURDAY AFTER 5 PM $7.50 <br>
      <br>
      Life as a Computer Programmer (PG13: SOME THEMATIC ELEMENTS, LANGUAGE AND BRIEF SEXUALITY., 95 min.)
      <br>
      Today's showtimes; <br>
      02:25PM 04:55PM 09:55PM <br>
      <br>
      May Cat Fred (R: VIOLENCE AND TERROR AND FOR LANGUAGE., 98 min.) <br>
      Today's showtimes: <br>
      Now showing on 2 screens. <br>
      2:45PM 03:30PM 05:15PM 07:00PM 07:45PM 09:30PM <br>
      <br>
      </font></p>
   </td>
</tr>
</table>
<PDA>
Shows at: MY CREEK CINEMA <br>
2224 Somestreet<br>
```

```
Someplacein, TX 78746<br>
512-333-2222 <br>
_ <br>
Life as a Computer Prgmr. (PG13) <br>
Showtimes; <br>
02:25PM 04:55PM 09:55PM <br>
<br>
May Cat Fred (R)<br>
Showtimes: <br>
2:45PM 03:30PM 05:15PM 07:00PM 07:45PM
    09:30PM <br>
<br>
</PDA>
</body>
</html>
```

Figure 2:
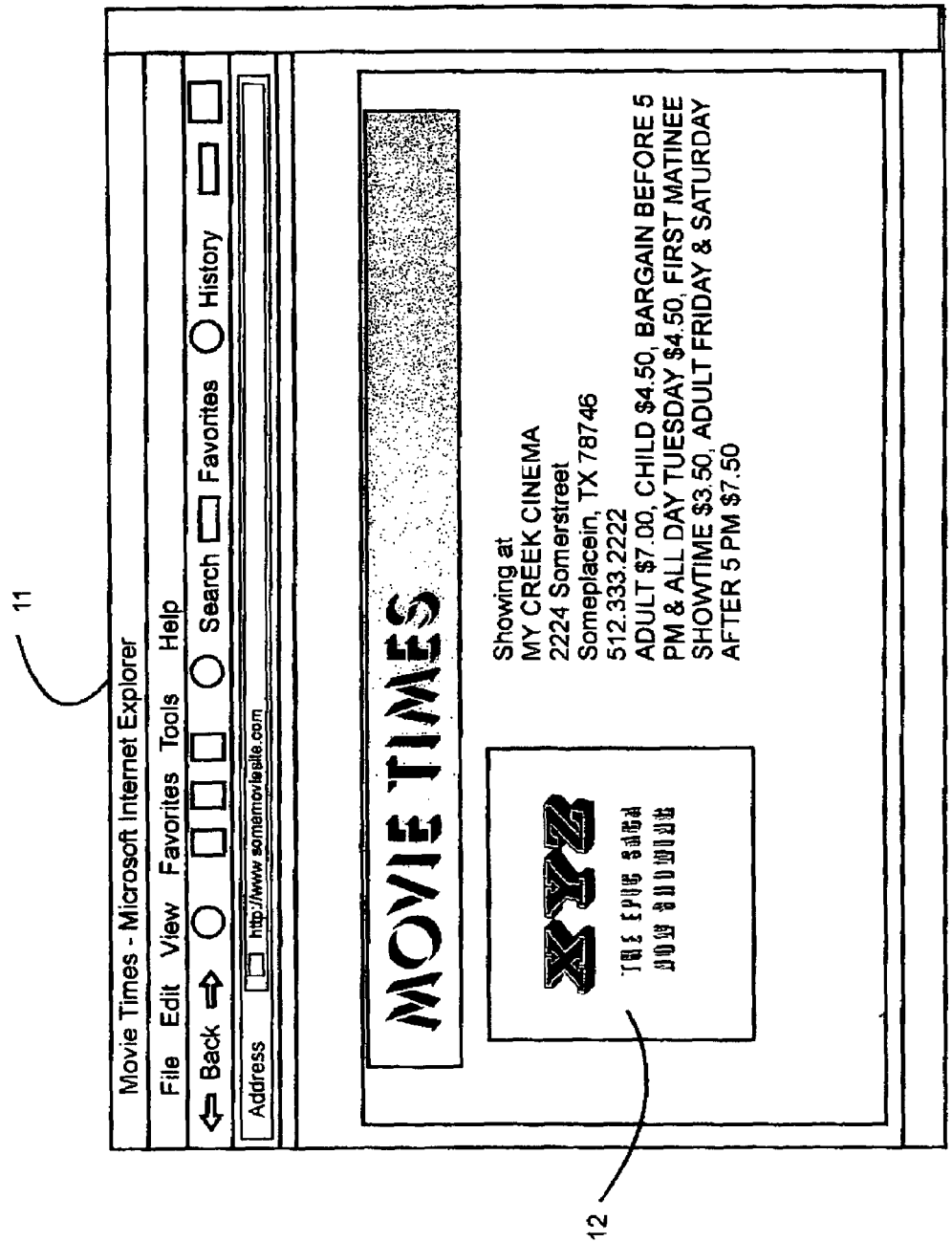
FIG. 2 is an illustrative desktop computer display screen showing the complete version of displayed information from a particular Web document.

The example is a Web document giving user movie information for "My Creek Cinema". The primary upper portion of the HTML code beginning with the tag <title> and ending with the tag </table> defines the conventional display for the cinema as would be displayed for the Web page on a desktop computer. When accessed by the user, this would appear as the contents 12 of desktop computer screen 11 in FIG. 2. There are graphic images as well as detailed information regarding the movies being shown at the cinema.

Figure 3:
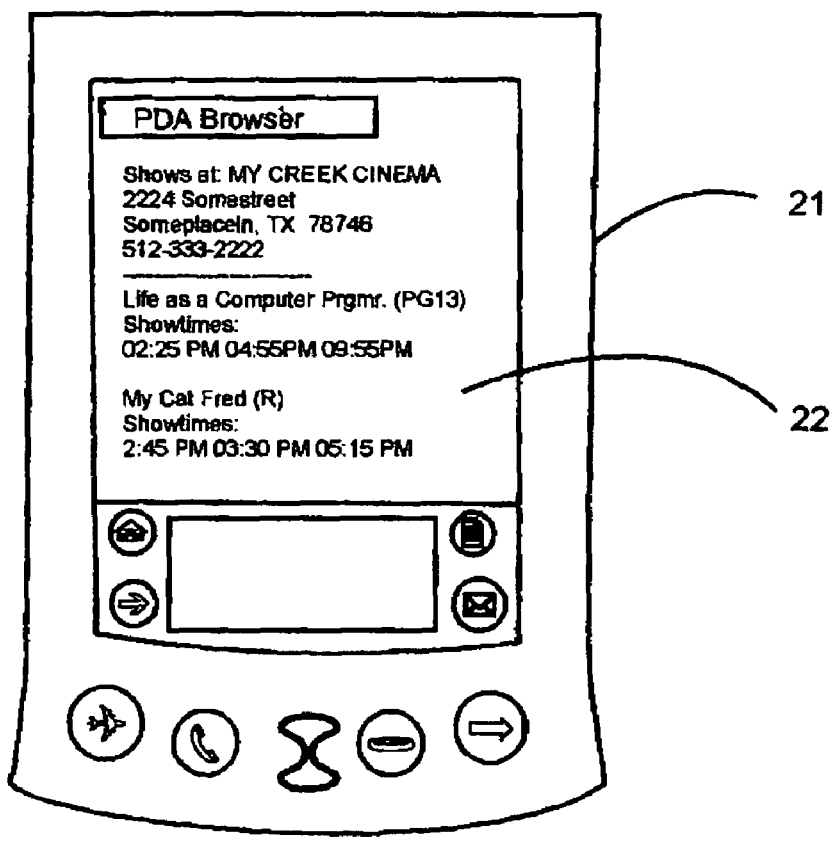
FIG. 3 is an illustrative palm-type computer display screen showing the condensed version according to the present invention of the information displayed in the desktop of FIG. 2.

On the other hand, when the same Web document is accessed by the PDA or palm-type device, only the code in the above HTML document between the tags <PDA> and </PDA> is accessed, and thus displayed as the condensed information content 22 on the display screen of the PDA 21 shown in FIG. 3. The data still relates to the cinema and the schedule of movies being shown, but is substantially condensed.

It should be noted that when the browser for a desktop computer accesses the HTML data on this page, it will ignore tags that it is not programmed to understand. Thus, the desktop browser ignores the <PDA>..</PDA> and the data therein between. Accordingly, the HTML page may be set up by their owners or developers with different displays for a plurality of different PDAs or palm-type devices, e.g. sets of tags such as <PalmIII>..</PalmIII>; 21 WinCE>..</WinCE>; <Nokia>..</Nokia>; or <PalmV>..</PalmV> may be used to define different sets of display data for the several different PDAs. Then the browsers associated with each of the different PDAs would be set up to access only the data defined by the tags which the respective browsers can read.

Figure 4:
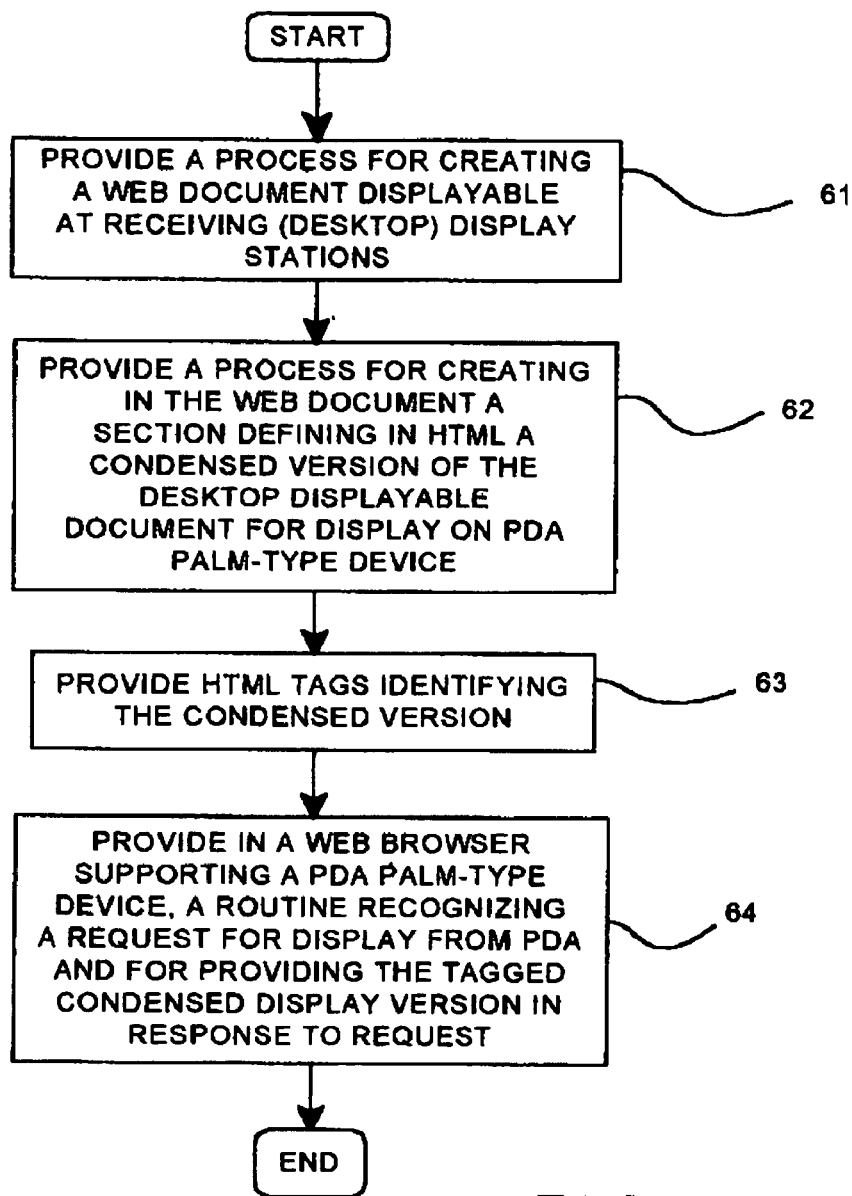
FIG. 4 is an illustrative flowchart describing the setting up of the method of the present invention for the creation and handling of HTML Web pages with versions of the same data content for desktop displays and condensed for display on personal palm-type devices.

Now, with reference to the programming set up shown in FIG. 4, the process of the present invention is set up to provide the developer with a process for creating a Web document, HTML, which is conventionally displayable at receiving (desktop) display stations on the Web, step 61. The developer is further enabled to create in the Web document, a section (<PDA> to </PDA> in the above HTML page) which defines a condensed version of the desktop displayable content for display on a PDA or Palm-type device, step 62. The developer is provided with HTML tags to define the condensed version, step 63. Then, there is provided in the Web browser programs which support the palm-type devices, routines for recognizing display requests from PDAs or palm-type devices and for providing the tagged condensed versions in response to such requests, step 64.

The present invention can operate to provide the developer or owner of the Web page with the most control over not only the original version of the document for the conventional desktop computer displays but also which information shall go into the condensed versions of the page to be accessed by the PDAs or palm-type devices. Accordingly, even if the Web access system involves the direct-dial Web browsers such as the hereinabove mentioned ProxiWeb which operates to significantly reduce the Web page size to fit the confines of the palm-type device, the program of the present invention may be set up so that the condensed versions of the present invention take precedence in determining the content of the PDA display, i.e. the condensed versions of this invention would override the reduced versions provided by the proxy servers in transcoding servers as in ProxyWeb where the browser program would otherwise detour the HTML data through a proxy server which resizes the Web page. Such proxy or transcoding servers are described on pp. 167–169 of the above cited text, *Palm III & PalmPilot*. In such a setup, the proxy server could first parse the transmitted Web page to determine if there were any PDA or like tags which would indicate a condensed version of the page created by the developer or owner of the page. If so, then there could be an override of the page normally provided to the PDA by the proxy server in favor of the condensed version provided by the system of the present invention.

Figure 5:
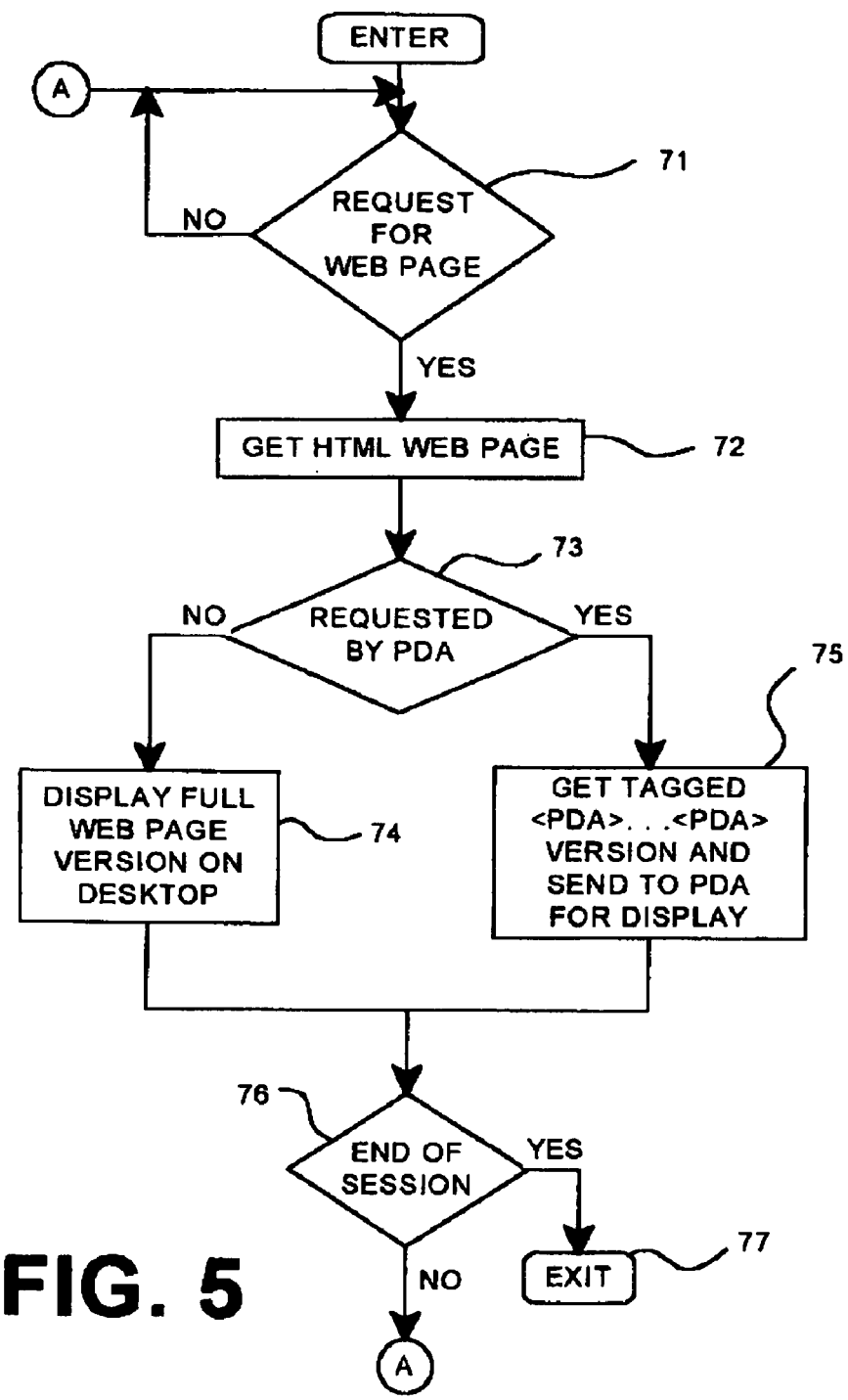
FIG. 5 is a flowchart of an illustrative run of the method set up in FIG. 4 on a Web network, like that shown in FIG. 1.

Now, with reference to the flowchart of FIG. 5, a simplified illustrative run of the process set up in FIG. 4 will be described. Initially, a determination is made as to whether there has been a request for a Web page, step 71. If No, the process is returned to step 71, and a Web request is awaited. If Yes, the HTML Web page is accessed from the Web, step 72. The request for the page may be by a PDA through its browser, a desktop computer through its browser or, in the case of a PDA functioning in HotSync with a desktop, then again through the desktop browser. In any event, step 73, a determination is made as to whether the request for the displayable data is from a PDA (palm device), step 73. If No, then, step 74, the full Web page version is parsed and displayed on the requesting desktop computer. If Yes, then step 75, the tagged condensed version is parsed from the Web page and sent to the Palm-type device for display. A determination is made as to end of session, step 76. If Yes, the session is exited, step 77. If No, the process is returned via branch "A" to initial step 71, and the process is continued.

It should be noted that the programs covered by the present invention may be stored outside of the present computer systems until they are required. The program instructions may be stored in another readable medium, e.g. in disk drive associated with the desktop computer or in a removable memory such as an optical disk for use in a CD ROM computer input, or in a floppy disk for use in a floppy disk drive computer input. Further, the program instructions may be stored in the memory of another computer prior to use in the system of the present invention and transmitted over a Local Area Network (LAN) or a Wide Area Network (WAN), such as the Internet, when required by the user of the present invention. One skilled in the art should appreciate that the processes controlling the present invention are capable of being distributed in the form of computer readable media of a variety of forms.

Although certain preferred embodiments have been shown and described, it will be understood that many changes and modifications may be made therein without departing from the scope and intent of the appended claims.

The invention claimed is:

1. In a World Wide Web communication network with user access via a plurality of data processor controlled interactive receiving display stations for displaying received hypertext documents containing information of a particular content represented by text and images, a system for condensing the displayed text/image representations of said particular content to the smaller dimensions of personal palm-type computer displays accessing said World Wide Web network comprising:
- a source on said World Wide Web for transmitting a Hypertext Markup Language document including:
  - a first set of natural language data conveying a first version of information of a particular content displayable to users at said receiving display stations, and
  - a second set of natural language data conveying a second version of condensed displayable information of the same particular content displayable to users of personal palm-type display computers connected to said remote locations; and
- a personal palm-type display computer with access to the World Wide Web including:
  - means for accessing said second set of natural language data from a received Hypertext Markup Language document.

2. The system of claim 1 wherein said Hypertext Markup Language document further includes:
- a first set of tags identifying said first set of natural language data; and
- a second set of tags identifying said second set of natural language data.

3. The system of claim 2 wherein said means whereby said personal palm computer accesses the World Wide Web comprises:
- a browser associated with said personal palm computer including:
- means responsive said second set of tags to transmit said second set of natural language data to said personal palm computer.

4. The system of claim 3 further including:
- a proxy server associated with said browser for transmitting proxy condensed versions of Web HTML documents to personal palm-type computers, and
- means for overriding said proxy servers to thereby permit the accessing by said palm-type computers of said second set of natural language data conveying said second version of condensed displayable data.

5. The system of claim 2 further including:
- a receiving display station associated with said personal palm-type display computer, and
- means whereby said personal palm computer accesses said World Wide Web through said receiving display station.

6. The system of claim 5 wherein said means whereby said personal palm computer accesses the World Wide Web comprises:
- a browser for said associated receiving display station including:
- means responsive to said second set of tags to transmit said second set of natural language data to said personal palm computer.

7. The system of claim 2 wherein the Hypertext Markup Language document further includes:
- at least one additional set of natural language data conveying an additional version of condensed displayable information of the same particular content displayable to users of other personal palm-type display computers connected to said remote locations, and
- at least one additional set of tags identifying said at least one additional set of natural language data.

8. The system of claim 2 wherein said first set of natural language data includes a portion of said second set of natural language data.

9. The Hypertext Markup Language document of claim 1 further including:
- at least one additional set of natural language data conveying an additional version of condensed displayable information of the same particular content displayable to users of other personal palm-type display computers connected to said remote locations, and
- at least one additional set of tags identifying said at least one additional set of natural language data.

10. The Hypertext Markup Language document of claim 1 wherein said first set of natural language data includes a portion of said second set of natural language data.

11. In a World Wide Web communication network with user access via a plurality of data processor controlled interactive receiving display stations for displaying received hypertext documents containing information of a particular content represented by text and images, a method for condensing the displayed text/image representations of said particular content to the smaller dimensions of personal palm-type computer displays accessing said World Wide Web comprising:
- transmitting from a source on said World Wide Web, a Hypertext Markup Language document including:
  - a first set of natural language data conveying a first version of information of a particular content displayable to users at said receiving display stations, and
  - a second set of natural language data conveying a second version of condensed displayable information of the same particular content displayable to users of personal palm-type display computers connected to said remote locations; and
- accessing the World Wide Web with a personal palm-type display computer including the step of:
  - accessing at said palm-type display computer said second set of natural language data from a received Hypertext Markup Language document.

12. The method of claim 11 wherein said Hypertext Markup Language document further includes:
- a first set of tags identifying said first set of natural language data, and
- a second set of tags identifying said second set of natural language data.

13. The method of claim 12 further including:
- accessing the World Wide Web through a browser including the step of transmitting said second set of natural language data to said personal palm computer responsive to said second set of tags.

14. The method of claim 13 including the further steps of:
- normally providing a condensed version of Web HTML documents to personal palm-type computers, and
- overriding said proxy servers to thereby permit the accessing by said palm-type computers of said second set of natural language data conveying said second version of condensed displayable data.

15. The method of claim 12 wherein the Hypertext Markup Language document further includes:
- at least one additional set of natural language data conveying an additional version of condensed displayable information of the same particular content displayable to users of other personal palm-type display computers connected to said remote locations, and
- at least one additional set of tags identifying said at least one additional set of natural language data.

16. The method of claim 12 wherein said first set of natural language data includes a portion of said second set of natural language data.

17. The method of claim 11 wherein the network further includes a receiving display station associated with said personal palm-type display computer, and the method includes:

the further step of accessing the World Wide Web by said personal palm computer through said associated receiving display station.

18. The method of claim 17 wherein said step of accessing the World Wide Web by said personal palm computer comprises:

accessing the World Wide Web through a browser for said associated receiving display station including the step of:

transmitting said second set of natural language data to said personal palm computer responsive to said second set of tags.

19. A computer program having code recorded on a computer readable medium for providing condensed versions of displayable information to personal palm-type computers connected to a World Wide Web communication network comprising:

a Hypertext Markup Language document transmitted on said World Wide Web including:

a first set of natural language data conveying a first version of information of a particular content displayable to users at said receiving display stations, and a second set of natural language data conveying a second version of condensed displayable information of the same particular content displayable to users of personal palm-type display computers connected to said remote locations; and means at a personal palm-type display computer with access to the World Wide Web for accessing said second set of natural language data from a received Hypertext Markup Language document.

20. The computer program of claim 19 wherein said Hypertext Markup Language document further includes:

a first set of tags identifying said first set of natural language data, and a second set of tags identifying said second set of natural language data.

21. The computer program of claim 20 wherein said means whereby said personal palm computer accesses World Wide Web comprises a browser including:

means responsive said second set of tags to transmit said second set of natural language data to said personal palm computer.

22. The computer program of claim 20 wherein said network further includes:

a receiving display station associated with said personal palm-type display computer, and means whereby said personal palm computer accesses said World Wide Web through said receiving display station.

23. The computer program of claim 22 wherein said means whereby said personal palm computer accesses the World Wide Web comprises:

a browser for said associated receiving display station including:

means responsive said second set of tags to transmit said second set of natural language data to said personal palm computer.

24. The computer program of claim 20 wherein the Hypertext Markup Language document further includes:

at least one additional set of natural language data conveying an additional version of condensed displayable information of the same particular content displayable to users of other personal palm-type display computers connected to said remote locations, and at least one additional set of tags identifying said at least one additional set of natural language data.

25. The computer program of claim 19 wherein said first set of natural language data includes a portion of said second set of natural language data.

26. In a World Wide Web communication network with user access via a plurality of data processor controlled interactive receiving display stations for displaying received hypertext documents containing information of a particular content represented by text and images, a system for condensing the displayed text/image representations of said particular content to the smaller dimensions of personal palm-type computer displays accessing said World Wide Web network comprising:

a Hypertext Markup Language document on the World Wide Web including:

a first set of natural language data conveying a first version of information of a particular content displayable to users at said receiving display stations, and a second set of natural language data conveying a second version of condensed displayable information of the same particular content displayable to users of personal palm-type display computers connected to said remote locations; and a personal palm-type display computer with access to the World Wide Web including:

means for accessing said second set of natural language data from a received Hypertext Markup Language document.

27. The system of claim 26 wherein said Hypertext Markup Language document further includes:

a first set of tags identifying said first set of natural language data, and a second set of tags identifying said second set of natural language data.

* * * * *